(No Model.)

D. E. OWEN.
RUNNER ATTACHMENT FOR VEHICLES.

No. 594,752. Patented Nov. 30, 1897.

Witnesses
E. G. McAfee
K. A. Nau

Inventor,
David E. Owen,
by John Wedderburn
Attorney

THE NORRIS PETERS CO., PHOTO-LITHO., WASHINGTON, D. C.

UNITED STATES PATENT OFFICE.

DAVID E. OWEN, OF GARLO, OHIO.

RUNNER ATTACHMENT FOR VEHICLES.

SPECIFICATION forming part of Letters Patent No. 594,752, dated November 30, 1897.

Application filed June 18, 1896. Serial No. 595,966. (No model.)

*To all whom it may concern:*

Be it known that I, DAVID E. OWEN, a citizen of the United States, residing at Garlo, in the county of Geauga and State of Ohio, have invented certain new and useful Improvements in Runner Attachments for Vehicles; and I do hereby declare the following to be a full, clear, and exact description of the invention, such as will enable others skilled in the art to which it appertains to make and use the same.

My invention relates to improvements in shoe or runner attachments for wheeled vehicles, the object of the same being to provide a simple, cheap, and readily and conveniently adjusted device for converting a carriage or wagon into a sleigh.

The invention consists of a sleigh-runner having loops or staples upon its upper side and a clamp for securing the runner to the wheel of the vehicle made up of a base-plate engaging the inner surface of the wheel-rim, a clamping-plate upon the upper surface of said base-plate, a thumb-screw passing through said clamping-plate and engaging the top surface of said base-plate, and loops fitting over the outer ends which engage the staples on said runner.

The invention also consists in other details of construction and combinations of parts, which will be hereinafter more fully described and claimed.

Figure 1:
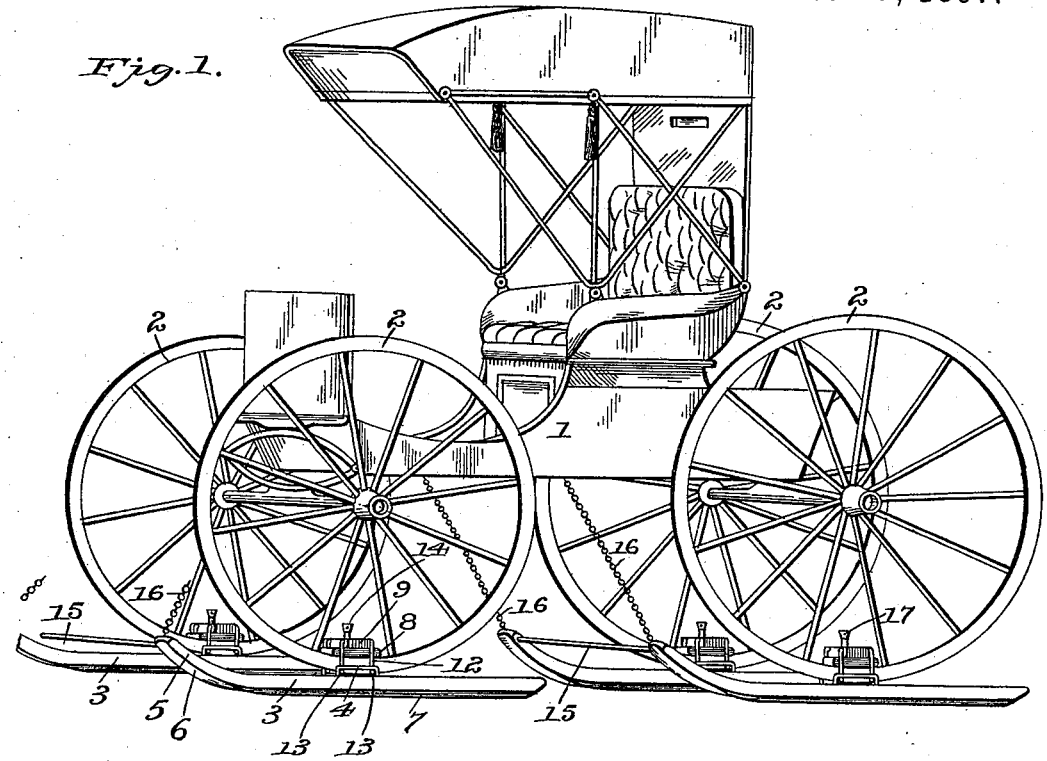
Figure 2:
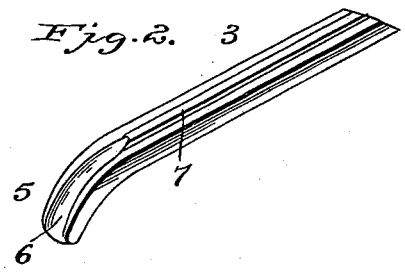
Figure 3:
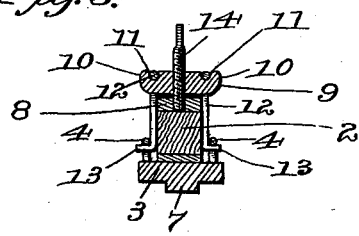

In the drawings forming part of this specification, Figure 1 represents a perspective view of a wheeled vehicle with my improved runner applied thereto. Fig. 2 is a detail perspective view showing the shape of the under side of the runner. Fig. 3 is a vertical section through the parts of the clamp.

Like reference-numerals indicate like parts in the different views.

The vehicle 1 is of the ordinary form of construction and is provided with wheels 2 2. Adapted to be attached to the under side of the wheels 2 is a runner 3, having loops or staples 4 4 secured to the top surface thereof and formed with an upturned forward end 5, having a groove 6 upon the under side thereof, and with a longitudinal ridge 7 upon the under side of the flat portion of said runner. The clamp by which the runner 3 is attached to the wheel 2 is made up of a base-plate 8, resting upon the inner surface of the wheel-rim, a clamping-plate proper, 9, fitting upon the top surface of the plate 8 and having upturned outer ends 10, with grooves 11 11 upon their upper sides. Fitting within the grooves 11 are looped strips 12, of wire or other suitable material, having hooks 13 13 upon their lower ends, which are adapted to fit within and engage the staples 4 upon the upper side of the runner 3. A thumb-screw 14 passes through the plate 9 and engages the top surface of the base-plate 8 for the purpose of tightening or loosening the connection between the runner 3 and the wheel 2. Suitable rods 15 may be provided for connecting the forward ends of each pair of runners, and chains 16 may be attached thereto for connecting the runners to the evener or singletree on the front pair or to the box or the body of the wheeled vehicle on the rear pair. This, however, is a mere detail.

My improved runner and fastening device is extremely simple in construction, can be carried in the body of a wheeled vehicle, and be readily applied whenever the condition of the roads necessitates or justifies it.

While I have described one runner for each of the wheels 2, it is obvious that I may use a single runner for each side of the vehicle, which shall be attached to both the front and back wheels. The longitudinal groove 6 upon the under side of the upturned end 5 of the runners is provided for the purpose of packing snow, especially when it is soft or slushy, under the middle or bearing part of the shoe, where it is most needed. The longitudinal ridge 7 provides an easy bearing-surface for the runner. The upper end of the screw 14 may have an opening 17 therethrough, by means of which a bar may be applied for the purpose of turning said screw.

Having now described my invention, what I claim as new, and desire to secure by Letters Patent, is—

1. The combination with a wheeled vehicle and especially with the wheels thereof, of a runner having loops or staples upon its upper side and a clamp for securing the runner to said wheel, made up of a base-plate engaging the inner surface of the wheel-rim, a clamping-plate upon the upper surface of said base-plate, a thumb-screw passing through said clamping-plate and engaging the top surface of said base-plate and loops fitting over the outer ends of said clamping-plate and provided with hooks upon their lower ends which engage the staples on said runner, substantially as and for the purpose described.

2. The combination with a wheeled vehicle and especially with the wheels thereof, of a runner having loops or staples upon its upper side and a clamp for securing the runner to said wheel, made up of a base-plate engaging the inner surface of the wheel-rim, a clamping-plate upon the upper surface of said base-plate having grooves upon its upper surface, a thumb-screw passing through said clamping-plate and engaging the top surface of said base-plate and loops fitting within said grooves and provided with hooks upon their lower ends which engage the staples on said runner, substantially as and for the purpose described.

In testimony whereof I have signed this specification in the presence of two subscribing witnesses.

DAVID E. OWEN.

Witnesses:
ARTHUR B. CARY,
DANIAL H. OWEN.